United States Patent [19]

Okumura et al.

[11] Patent Number: 5,497,559
[45] Date of Patent: Mar. 12, 1996

[54] METHOD OF MEASURING PRELOAD CLEARANCE IN DOUBLE ROW ROLLING BEARING AND APPARATUS THEREFORE

[75] Inventors: Kenichi Okumura; Hakaru Fujioka, both of Shiga; Kazuhiro Oshima, Moriyama, all of Japan

[73] Assignee: NSK Ltd., Tokyo, Japan

[21] Appl. No.: 383,157

[22] Filed: Feb. 3, 1995

[30] Foreign Application Priority Data

Feb. 4, 1994 [JP] Japan .................................. 6-012973

[51] Int. Cl.⁶ .............................. G01B 5/02; G01B 5/14
[52] U.S. Cl. ................... 33/517; 33/833; 33/600
[58] Field of Search ............................. 33/517, 701, 832, 33/833, 837, 600, 549, 555; 73/865.8, 865.9, 118.1; 29/724

[56] References Cited

U.S. PATENT DOCUMENTS

| | | | |
|---|---|---|---|
| 4,468,861 | 9/1984 | Overland | 33/517 |
| 4,993,165 | 2/1991 | French et al. | 33/517 |
| 5,224,273 | 7/1993 | Dellas | 33/517 |
| 5,325,599 | 7/1994 | Russell | 33/517 |

FOREIGN PATENT DOCUMENTS 5-256635  10/1993  Japan .

Primary Examiner—Christopher W. Fulton

[57] ABSTRACT

A method of measuring the preload clearance in a double row rolling bearing. The method includes the steps of fixing the outer end face of the first inner ring in position while subjecting the outer end face of the second inner ring to a first load in a direction which moves the second inner ring toward the first inner ring at a relatively smaller constant amount so as not to reduce the preload clearance to zero, and obtaining a value $H_1$ corresponding to the position of the outer end face of the second inner ring. Fixing the outer end face of the first inner ring in position while subjecting the outer end face of the second inner ring to a second load in a direction which moves the second inner ring toward the first inner ring at a relatively larger, constant amount enough to reduce the preload clearance to zero and obtaining the value $H_2$ corresponding to the position of the outer end face of the second inner ring. Then calculating the difference between the value $H_1$ and the value $H_2$ thereby providing a displacement amount, and obtaining the preload clearance from the displacement amount based on a predetermined relationship between the displacement amount and the preload clearance.

2 Claims, 3 Drawing Sheets

METHOD OF MEASURING PRELOAD CLEARANCE IN DOUBLE ROW ROLLING BEARING AND APPARATUS THEREFORE

FIELD OF THE INVENTION

The present invention is related to a process end apparatus to measure a preload clearance in a double row rolling bearing, which are utilized to measure the size of the preload clearance provided to preload the double row rolling bearing upon rotatably support a vehicle wheel.

A double row rolling bearing used to support a vehicle wheel in a suspension apparatus comprises, as shown in FIG. 1, an outer ring or race 1 having outer raceways 2 in double rows on its inner peripheral surface, a pair of inner ring or race 3a, 3b concentric with the outer ring or race 1 on the inside of the outer ring or race 1 and having an inner raceway on their outer peripheral surfaces, respectively, and a plurality of rolling members 5 provided between the inner raceways 4 and the outer raceways 2, respectively. The outer race or ring 1 is supported by a suspension apparatus (not shown for installation in the vehicle.

Generally, the prior art double row rolling bearing as shown above is adapted to provide the rolling members 5 with a slight preload or a slight clearance when installed in the vehicle. And, there is no mas-productive double row rolling bearing having the inner rings or races 3a, 3b between the inner end edges of which a preload clearance is provided to preload the rolling members 5 by a predetermined amount.

Recently, the double row rolling bearings for installation into vehicles are developed to have a preload clearance in themselves before installation in order to increase rigidity in the wheel bearing portion and reduce the weight of the wheel bearing portion and to improve driving performance. It is noted that the double row rolling bearing having a preload provided in the rolling members 5 can be given more rigidity than the double row rolling bearing without such a preload.

Accordingly, the bearing manufacturers are requested by the automobile manufacturers to provide the bearings themselves with a slight preload clearance in the stage of bearing production and to guarantee the precision of the preload clearance.

In the double row rolling bearing of FIG. 1, the rolling members 5 are preloaded before installation into the vehicle by regulating the outer ring 1, inner rings 3a, 3b and rolling members 5 in size so that the inner end edges of the pair of inner rings 3a, 3b are abutted to each other so as to provide the rolling members 5 with a predetermined preload. It will be noted that the inner end edge of the inner ring 3a is faced to the inner end edge of-the inner ring 3b.

Specifically, the pair of inner rings 3a, 3b are lightly pressed at their outer end faces so as to be moved toward each other so that a clearance is formed between the inner end edges of the inner rings 3a, 3b to have a width size h in the state where the rolling members 5 are lightly engaged with the outer raceways 2 and with the inner raceways 4. It will be noted that the outer end faces of the inner rings 3a, 3b are faced to the opposite directions.

The inner end edges come into contact with each other when preloaded upon installation of the double row rolling bearing into the vehicle. In this state, the outer ring 1, inner rings 3a, 3b and rolling members 5 are elastically deformed to produce a preload.

Accordingly, the width size h is referred to as a preload clearance for providing a predetermined preload.

Incidentally, the rolling members 5 are formed in a ball shape, but can be formed in a tapered roll shape for use in a hub unit incorporated in a heavy vehicle. In this case, the raceways 2 and 4 have a linear cross sectional shape.

Anyhow, it is important to provide a double row rolling bearing and the vehicle with such a double row rolling bearing with the best performance that the preload clearance is regulated to a proper value so as to provide the rolling members 5 with a preload.

If the preload clearance or preload is too small, or if a force to press the rolling members 5 between the raceways 2 and 4 is too small, the bearing rigidity would be insufficient, and in a worst case, backlash would be caused in the inner rings 3a, 3b to support the axle inside the outer ring 1. Consequently, the traveling stability of vehicle would be damaged or in an extreme case, abnormal noises would be produced during traveling.

On the contrary, if the preload clearance or preload is too large, or if a force to press the rolling members 5 between the raceways 2 and 4 is too large, the rotation resistance would be so increased that the power capacity and fuel consumption performance of the vehicle would be reduced, or the life of the hub unit would be shortened due to the excessive face pressure on the rolling face of the rolling members or on the raceways. In the worst cases, normal operation would be impossible due to abnormal heat generation.

In order to avoid any poor preload to cause various troubles as mentioned above, the width size h of the clearance 6 must be obtained corresponding to the preload clearance. If the width size obtained is displaced out of the proper range, the double row rolling bearing having such an improper width size must be thrown away, and the data are fed back to the processing steps of bearing parts to adjust the width size in the proper range.

Such a method to measure the preload or preload clearance in the double row rolling bearing is disclosed in Japanese Patent First Publication KOKAI No. H5-256635 as follows;

(1) In the state where the inner rings 3a, 3b are abutted at their inner end edges to each other under a preload, the outer ring 1 is rotated with reference to the inner rings 3a, 3b to obtain the rotating torque, from which the preload is obtained.

(2) A spacer having a thickness T (known) in size is sandwiched between the inner rings 3a, 3b to obtain the axial displacement ha due to the spacer of the inner ring 3a, 3b with reference to the outer ring 1, from which the preload clearance h is obtained to be equal to T-ha.

(3) A constant pressure fluid such as a compressed air is sent to the inside of the inner ring 3a, 3b assembled as shown in FIG. 1 and flowed out through the clearance 6 to outside, and the flow amount and back pressure at this moment are measured to know the width size h of the clearance 6, In the measurement of bearing preload as in Measurements (1) to (3) mentioned above, however, there are some problems as follows;

In the case of Measurement (1), because the preload is not directly measured, the preload is not precisely obtained, Since the .quality precision required in the double row rolling bearing for use in the recent automobile industry is very severe, so that sufficient precision is hardly obtained in the Measurement (1).

In Measurement (2), precise values for the preload clearance is obtained, but it is inconvenient and takes a long time to sandwich the spacer between the inner rings 3a, 3b. In addition, automation is so difficult, that it is impossible to measure large number of double row rolling bearings for the preload clearance, e.g. in the case where the whole number of the products are examined in situ in the manufacturing plants.

Measurement (3) is worse in measurement precision to Measurement (2). Specifically, the flow amount and back pressure when the constant pressure fluid flows out of the clearance 6 is varied due to various causes even if the clearance 6 has a constant; width size h. For example, the temperature, humidity (water content), or cleanness, of the constant pressure fluid, or the width size, surface roughness, chamfering degree, etc. of the inner end edges of the inner rings 3a, 3b, variances of the clearance components etc. would cause the flow amount or back pressure to change in a not-negligible degree. Accordingly, sufficient precision would hardly be obtained.

In addition, foreign materials such as duet can exist in the outlet port of the constant pressure fluid, or in the inner end edge portions of the inner rings 3a, 3b, and be blown by the constant pressure fluid to enter the interior of the bearing where the rolling members 5, outer raceways 2 and inner raceways 4 are located. Such foreign materials entering the interior of the bearing would undesirably affect the bearing performance.

SUMMARY OF THE INVENTION

An objective of the present invention is to provide a method and apparatus to measure the preload clearance of the double row rolling bearing to overcome the problems as mentioned above.

Another objective of the present invention is to provide a method of measuring the preload clearance in a double row rolling bearing which comprises an outer ring having outer raceways in double rows on its inner peripheral surface, first and second inner rings each having an inner raceway on its outer peripheral surface and each provided concentric with the outer ring, and a plurality of rolling members provided between the inner raceways and the outer raceways in double rows, respectively, and the rolling members being preloaded in the state where the first and second inner rings are abutted to each other at their inner end edges, and the method comprising the following steps (a) to (c).

(a) The outer end face of the first inner ring is fixed in position while the outer end face of the second inner ring is subjected to a first load in a direction to move the second inner ring toward the first inner ring at a relatively smaller constant amount so as not to reduce the preload clearance to zero, and to obtain the value $H_1$ corresponding to the position of the outer end face of the second inner ring.

(b) The outer end face of the first inner ring is fixed in position while the outer end face of the second inner ring is subjected to a second load in a direction to move the second inner ring toward the first inner ring at a relatively larger, constant amount enough to reduce the preload clearance to zero, and to obtain the value $H_2$ corresponding to the position of the outer end face of the second inner ring.

(c) The difference between the value $H_1$ in the step (a) and the value $H_2$ in the step (b), that is ($H_2-H_1$), is calculated to provide a displacement amount, and the preload clearance is obtained from the displacement amount based on a predetermined relationship between the displacement amount and the preload clearance.

Another objective of the present invention is to provide an apparatus for measuring the reload clearance in the double row rolling bearing which comprises a receiving block having a face to which the outer end face of the first inner ring is abutted, a retaining block having a face provided with a retaining face to which the outer end face of the second inner ring is abutted, so that a relatively smaller first load is applied to the second inner ring such that the first load does not reduce the preload clearance to zero, a pressing device for applying a predetermined load to the retaining block so that a relatively larger second load which is sufficient to reduce the preload clearance to zero is applied to the second inner ring, and a measuring device for measuring the axial position of the retaining block.

In the method and apparatus for measuring the preload in the double row rolling bearing in the present invention, the preload clearance is easily and precisely obtained, and automation for measurement is possible.

DETAILED DESCRIPTION OF THE PREFERRED EMBODIMENTS

Figure 1:
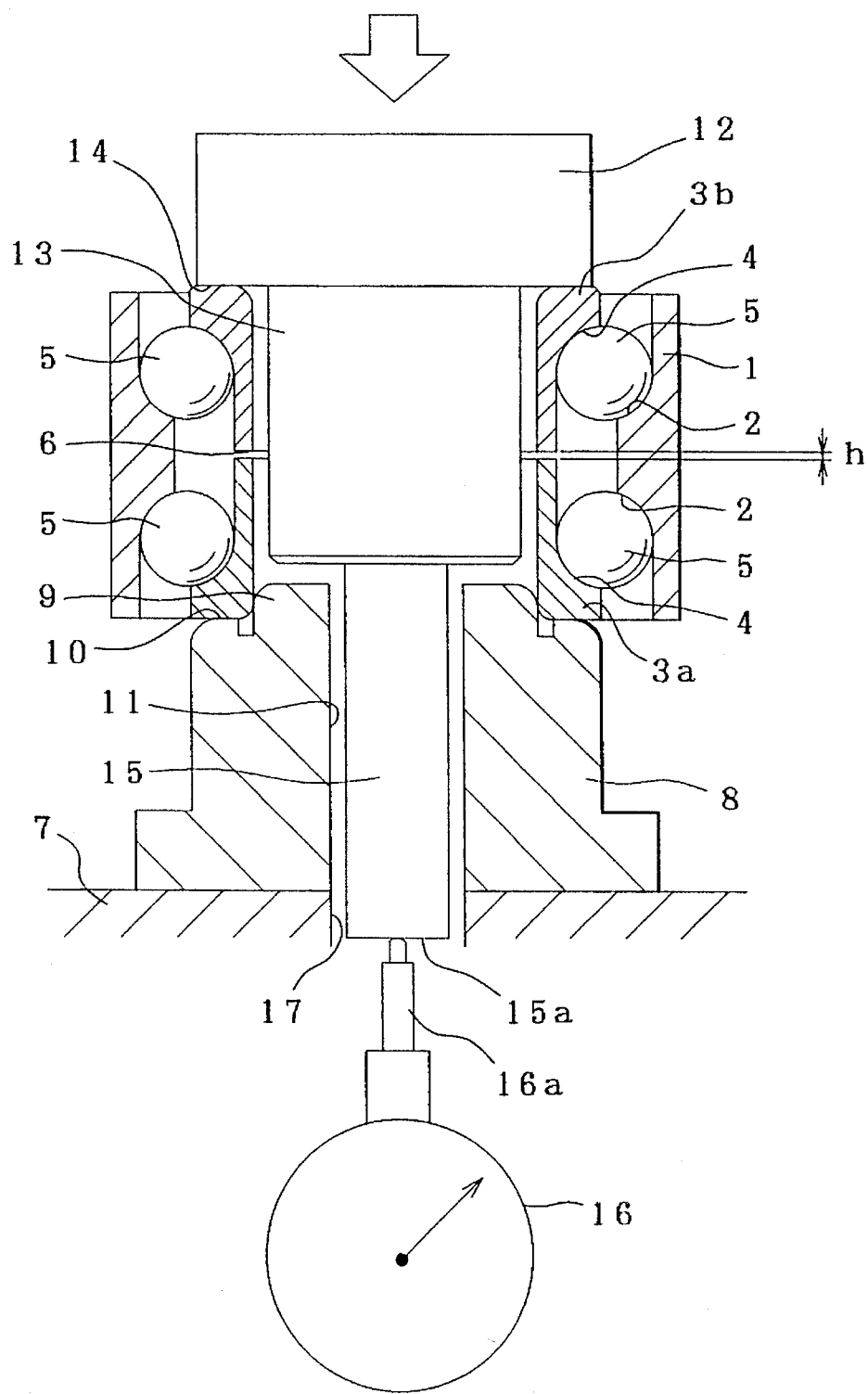
FIG. 1 is a vertical cross sectional view showing an example of the apparatus for measuring the preload clearance in the double row rolling bearing according to the present invention.

The present invention is realized through experiments where a number of double row rolling bearings as shown in FIG. 1 are produced and a predetermined load is applied axially to the outer end face of the inner rings in each of the bearings so as obtain the relationship between the displacement amount of the inner ring and the preload clearance. As a result, it is found out that when the same amount of load is applied to the bearings in the same series, that is the bearings produced in the same model number and in the same dimensions in design, the displacement amount and the preload clearance are substantially placed in a proportional relationship to each other above.

While a preload clearance exists between the inner end edges of the pair of inner rings, the load applied axially to the inner rings deforms elastically the outer rings and the rolling members. Consequently, the displacement amount is relatively larger with respect to the load.

On the contrary, when a further load is applied in the state where the preload clearance has disappeared (to zero), the pair of the inner rings are also plastically deformed, so that the displacement amount is relatively smaller with respect to the load. In principle, the line depicting the relationship between the load and the displacement amount bends at the point where the preload clearance disappears, so that this point of bending indicates the preload clearance.

However, it is impossible to detect the point of bending due to complicated states of deformation in the contact area between the rolling surfaces of rolling members, outer raceways and inner raceways.

What is assured through experiments is the proportional relationship between the displacement amount and the preload clearance due to the fact that the point where the displacement amount is made smaller with respect to the load is changed due to the sizes of the preload clearances.

Consequently, provided that the relationship between the displacement amount arid the preload clearance is previously obtained for the double row rolling bearing concerned, the preload clearance is obtained by measuring the displacement amount caused by the load.

Now, an embodiment of the apparatus for measuring the preload clearance in the double row rolling bearing according to the present invention is explained referring to FIG. 1.

The apparatus comprises a base plate 7 and a receiving block 8 fixed on the upper face of the base plate 7. The receiving block is made of such as a metal material which has a sufficient rigidity and is hard to be elastically deformed.

Formed in the upper center portion of the receiving block 8 is a short, cylindrical protrusion 9 which is sized to be inserted in the first or lower inner ring 3a without play.

Formed around the protrusion 9 on the end face of the receiving block 8 is an annular flat bearing surface 10 to which the outer end face (lower end face in FIG. 1) of the first or lower inner ring 3a is to be abutted.

Formed in the central portion of the receiving block 8 is a through hole 11 which is axially extended in the receiving block 8 and connected to a hole 17 formed in the base plate 7. The opening of the through hole 11 is placed in alignment with the opening of the hole 17.

Provided on the second or upper inner ring 3b is a retaining block 12 which is made of such as a metal material which is hard to be elastically deformed.

Formed in the lower central portion of the retaining block 12 is a protrusion 13 which is sized to be inserted in the pair of inner rings 3a, 3b.

Formed around the protrusion 13 on the lower surface of the retaining block 12 is an annular flat retaining face 14 to which the outer end face (upper end face in FIG. 1) of the second or upper inner ring 3b is abutted.

The retaining block 12 has a sufficient weight to apply to the second inner ring 3b a light first toad downwards.

Specifically, the first inner ring 3a is placed on the bearing face 10 of the receiving block 8 while the retaining block 12 is placed on the second inner ring 3b. In this state, the rolling faces of the rolling members 5, the outer raceways 2 and inner raceways are come into light contact with each other under substantially no preload. And, there is a clearance 6 between the inner rings 3a and 3b at their inner end edges. The width size h of this clearance 6 is the preload clearance to be measured.

Connected to the lower central portion of the protrusion 13 is the upper end portion of the transmission rod 15 which extends through the through-hole 11 in the central portion of the receiving block 8 and has a lower end which reaches the interior of the hole 17 formed in the base plate 7.

Provided below the transmission rod 15 is a measuring device 16 to measure the vertical position of the lower end face 15a of the transmission rod 15. The measuring device 16 has a probe 16a the upper end of which is abutted to the lower end face 15a of the transmission rod 15.

Various conventional comparators can be used for the measuring device 16 and many guide books are available on the comparators, Therefore, no explanation is made on the comparators in this specification.

It is desirable to use the measuring device 16 from which the measured value is taken out as an electric signal in the case of automatic measurement. Such an electric signal is processed in a microcomputer and other processors.

Disposed above the retaining block 12 is a pressing device (not shown) for applying a predetermined load to the upper face of the retaining block 12. For the pressing device, any hydraulic cylinder, air cylinder, feed screw mechanism etc. be used so long as a predetermined load can be applied to the upper face of the retaining block 12.

In operation, the width size h of the clearance 6 between the inner end edge of the inner ring 3a and the inner end edge of the inner ring 3b is measured by the apparatus according to the present invention as follows;

In the state where the first inner ring 3a is supported at its outer end face by the bearing face 10 of the receiving block 8, the retaining face 14 of the retaining block 12 is abutted to the outer end face of the second inner ring 3b.

As a result, the weight of the retaining block 12, that is a relatively smaller, constant first weight is applied to the outer end face of the second inner ring 3b. In this state, the level $H_1$ of the lower end face 15a of the transmission rod 15 is detected by the measuring device 16. The level $H_1$ of the lower end face 15a corresponds to the position of the outer end face of the second inner ring 3b.

The upper face of the retaining block 12 is pressed by the pressing device shown by an arrow in FIG. 1, so that a relatively larger, constant second load is applied to the outer end face of the second inner ring 3b. The second load is the sum of the force of the pressing device and the weight of the retaining block 12. In this state, the pair of inner rings 3a and 3b are abutted to each other at their inner end edges, so that the clearance 6 disappears.

Then, the level $H_2$ of the lower end face 15a of the transmission rod 15 is detected by the measuring device 16. The level $H_2$ corresponds to the position of the outer end face of the second inner ring.

The second load is desirably sufficiently large to reduce the preload clearance to zero and, in addition, to elastically deform the pair of inner rings 3a, 3b to a degree. This is to remove as much as possible the affects of complicated deformation caused at the contact areas between the rolling faces of the rolling members 5, outer raceways 2 and inner raceways 4.

Then, based on the previously obtained relationship between the displacement amount and the preload clearance, the preload clearance h is obtained corresponding to the displacement amount of $H_2-H_1$, that is the difference between the levels $H_1$ and $H_2$.

Figure 2:
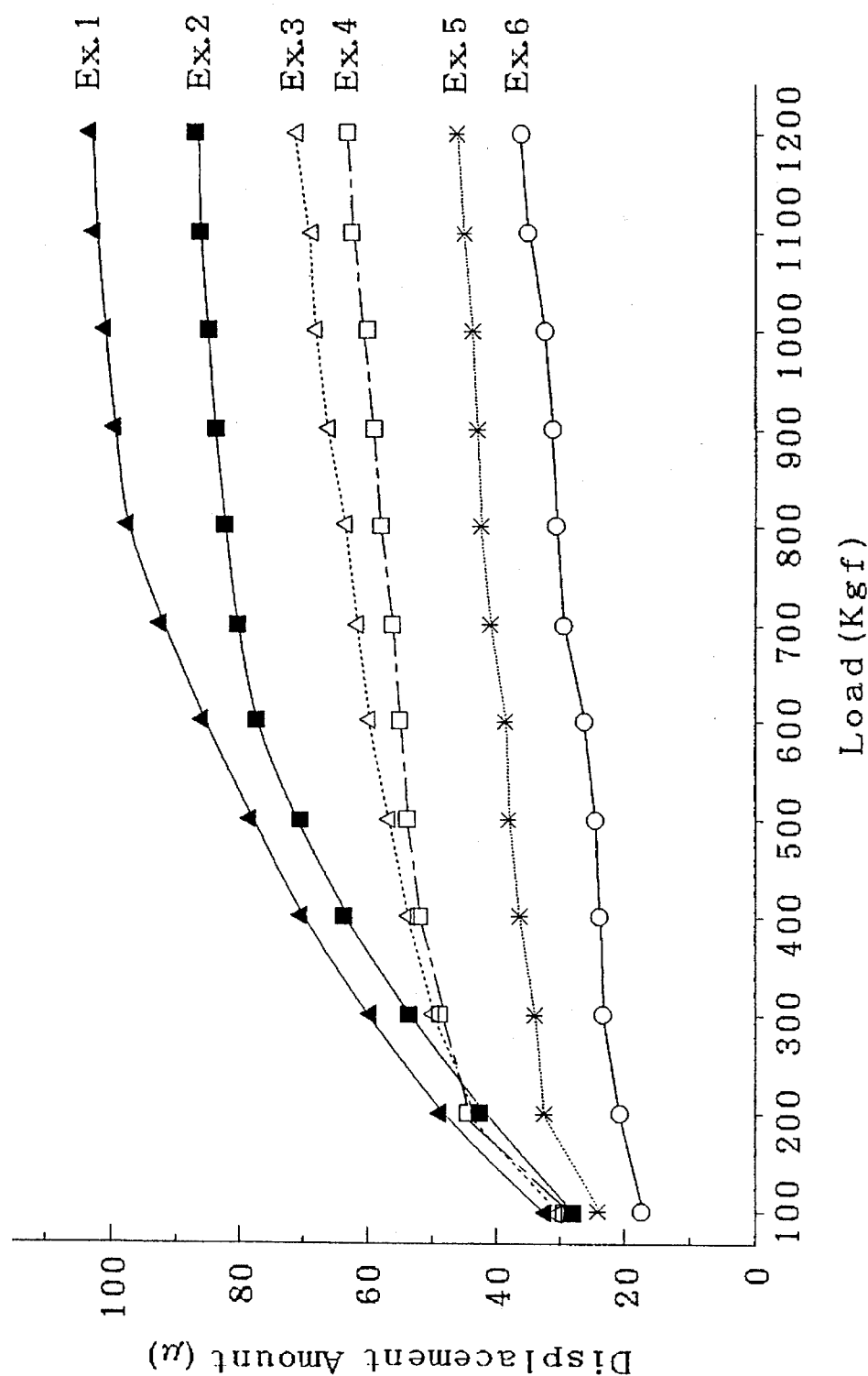
FIG. 2 is a graph showing a relationship between the displacement amount of the inner rings and the amount of the load applied axially to the inner rings.

The relationship between the displacement amount and the preload clearance is further explained as follows;

A number of double row rolling bearings in the same model number as shown in FIG. 1 were prepared, and the displacement amount was measured for these bearings by changing the amount of the load axially applied to the outer end faces of the pair of inner rings 3a and 3b. The results are shown in FIG. 2, where the measurement results on six examples are illustrated. It is clear in FIG. 2 that the displacement amount is varied depending on the examples even with the same load applied.

Figure 3:
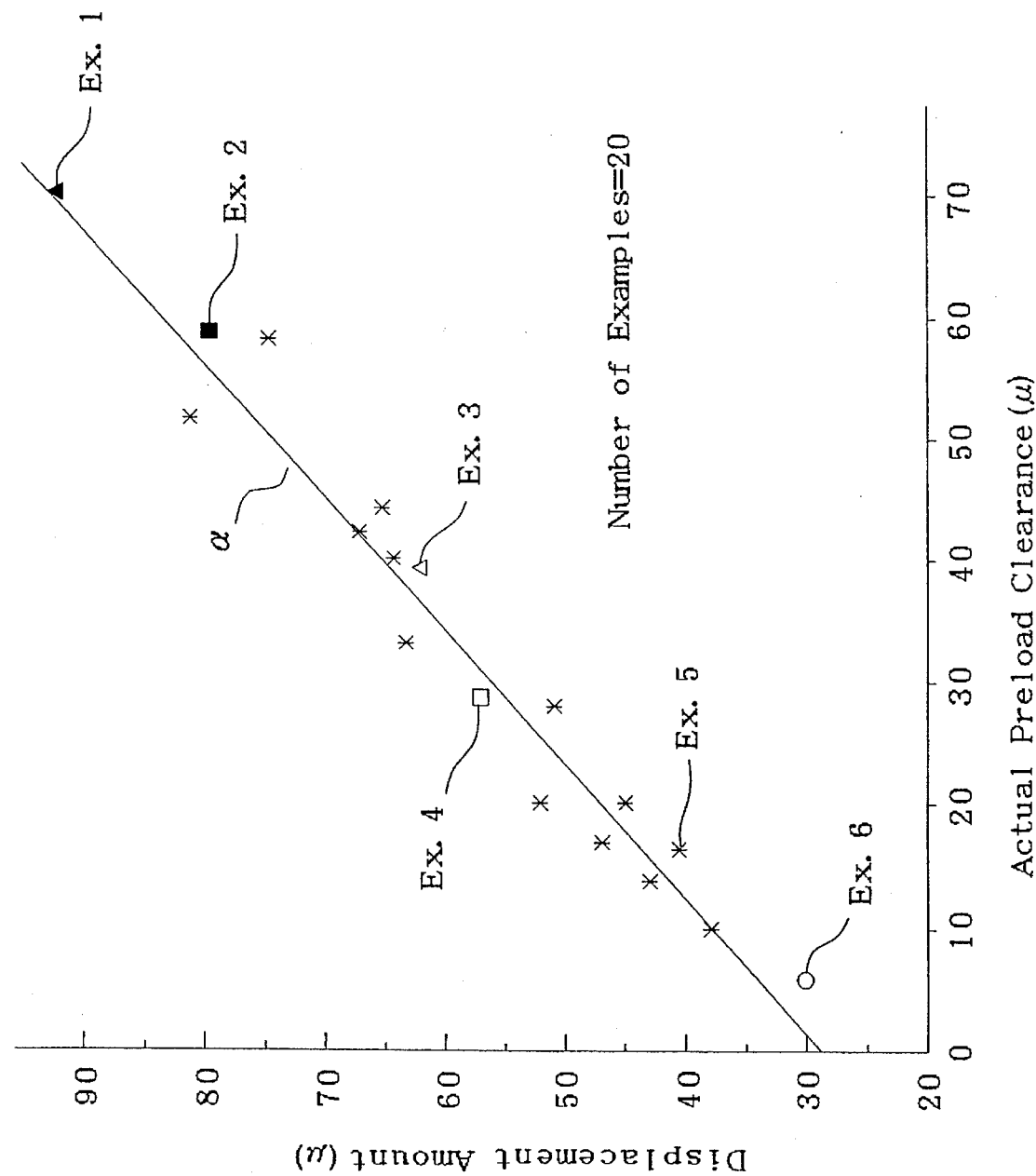
FIG. 3 is a graph showing a relationship between the displacement amount of the inner rings and the actual preload clearance when a predetermined load is applied axially to the inner rings.

Then, the relationship between the actual preload clearance h and the displacement amount was measured when a predetermined load (700 kgf) was axially applied to the outer end faces of the bearings 3a, 3b. The results are shown on FIG. 3, where the measurement results are illustrated from 20 kinds of examples. It is clear in FIG. 3 that there is a substantially proportional relationship between the displacement amount and the actual preload clearance h when a predetermined load is applied provided that the bearings are produced in the same model number and in the same dimensions on design.

Therefore, once the relationship (straight line α in FIG. 3) between the displacement amount and the preload clearance h is previously obtained for the double row rolling bearings in the model number concerned, the preload clearance can be obtained from the displacement amount due to the load.

Incidentally, the measurement of the preload clearance h can be precisely achieved by the methods previously known in the art e.g. referred to in (2) in the related art in this specification, In the case where the retaining face of the retaining block 12 is pressed against the outer face of the inner ring 3b through the elastic member such as a spring or a pressing device using a relatively low pressure fluid so as to provide the first load, the retaining block 12 and the receiving block 8 can be arranged in a lateral direction.

In the present invention, the following effects are obtained;
(1) The preload clearance is precisely measured before the actual preload is applied.
(2) The automatic measurement is possible, and the whole number of the double row rolling bearings can be examined in situ at the bearing manufacturers.

The creditability of such bearings and automobiles etc. with such bearings incorporated is increased.
(3) The defective products can be instantly checked as they occur, and the defect condition, that is insufficient preload or excessive preload is simultaneously informed.

Accordingly, such information is instantly fed back for eliminating such defective products. Thus, the number of defective products is minimized.
(4) Measurement errors due to oil mist etc. deposited on the bearings are prevented.

What is claimed is:

1. A method of measuring the preload clearance in a double row rolling bearing which comprises an outer ring having outer raceways in double rows on its inner peripheral surface, first and second inner rings each having an inner raceway on its outer peripheral surface and each provided concentric with the outer ring, and a plurality of rolling members provided between the inner raceways and the outer raceways in double rows, respectively, and the rolling members being preloaded in the state where the first and second inner rings are abutted to each other at their inner end edges, and the method comprising the following steps (a) to (c), (a) the outer end face of the first inner ring is fixed in position while the outer end face of the second inner ring is subjected to a first load in a direction to move the second inner ring toward the first inner ring at a relatively smaller constant amount so as not to reduce the preload clearance to zero, and to obtain the value $H_1$ corresponding to the position of the outer end face of the second inner ring, (b) the outer end face of the first inner ring is fixed in position while the outer end face of the second inner ring is subjected to a second load in a direction to move the second inner ring toward the first inner ring at a relatively larger, constant amount enough to reduce the preload clearance to zero, and to obtain the value $H_2$ corresponding to the position of the outer end face of the second inner ring, (c) the difference between the value $H_1$ in the step (a) and the value $H_2$ in the step (b), that is ($H_2-H_1$), is calculated to provide a displacement amount, and the preload clearance is obtained from the displacement amount based on a predetermined relationship between the displacement amount and the preload clearance.

2. An apparatus for measuring the preload clearance in a double row rolling bearing which comprises an outer ring having outer raceways in double rows on its inner peripheral surface, first and second inner rings each having an inner raceway on its outer peripheral surface and each provided concentric with the outer ring, and a plurality of rolling members provided between the inner raceways and the outer raceways in double rows, respectively, and the rolling members being preloaded in the state where the first and second inner rings are abutted to each other at their inner end edges, and the apparatus comprising a receiving block having a face to which the outer end face of the first inner ring is abutted, a retaining block having a face provided with a retaining face to which the outer end face of the second inner ring is abutted, so that a relatively smaller first load is applied to the second inner ring such that the first load does not reduce the preload clearance to zero, a pressing device for applying a predetermined load to the retaining block so that a relatively larger second load which is sufficient to reduce the preload clearance to zero is applied to the second inner ring, and a measuring device for measuring the axial position of the retaining block.

\* \* \* \* \*